Nov. 1, 1955    C. H. KANGAS    2,722,123
FLUID DENSITY AND LEVEL RECORDER
Filed Oct. 18, 1954    3 Sheets-Sheet 2

INVENTOR.
C.H. KANGAS

BY Hudson & Young

ATTORNEYS

Nov. 1, 1955  C. H. KANGAS  2,722,123
FLUID DENSITY AND LEVEL RECORDER
Filed Oct. 18, 1954  3 Sheets-Sheet 3

INVENTOR.
C.H. KANGAS
BY Hudson & Young
ATTORNEYS

United States Patent Office 2,722,123
Patented Nov. 1, 1955

2,722,123

FLUID DENSITY AND LEVEL RECORDER

Charles H. Kangas, Bartlesville, Okla., assignor to Phillips Petroleum Company, a corporation of Delaware Application October 18, 1954, Serial No. 462,807

12 Claims. (Cl. 73—216)

The present invention relates to automatic means for determining the volume and density of a liquid. A more specific aspect relates to automatic means for continuously determining and recording the gain or loss in volume and density of a circulating drilling fluid.

In the drilling of wells by the method commonly known as "rotary drilling," it is common practice to circulate a drilling fluid or mud through the drill stem, into the bore hole, and up the bore hole into drilling fluid containers. By such a circulation of drilling fluid, lubrication and cooling are provided for the drill bit. The fluid is also utilized to carry away small particles of formation that are cut from the formations penetrated by the bit. When properly compounded, the fluid is used for building up a sheath on the wall of the bore hole. Such a sheath tends to prevent caving of the uncased portions of the bore hole and reduces the flow of drilling fluid from the bore hole to the formation, or the flow of formation fluid from the formation to the well bore. Another important function of the drilling fluid is to maintain a fluid column of sufficient weight and consistency to control any fluid pressures that may be encountered in underground formations.

The amount of drilling fluid required to build a sheath on the wall of the bore hole depends on the porosity of the formation penetrated and, to a great extent, upon the permeability. Strata of rock within the productive limits of an oil or gas reservoir will have relatively uniform characteristics of porosity, permeability, and gas content. When gas- or liquid-bearing formations are penetrated and the pressure of the fluid therein is equal to or greater than the pressure of the circulating drilling fluid column, fluid from the formation will pass into the bore hole and will become entrained in the drilling fluid, thus increasing the discharge fluid volume. If the entrained formation fluid is a gas the specific gravity of the drilling fluid is decreased accordingly. If such entrainment is allowed to continue the weight of the column of fluid will become insufficient to overcome the gas pressure in the formation. In such cases a "blow-out" will result; drilling fluid and possibly the rotary drill pipe will be blown from the bore hole.

Upon penetration of highly porous and permeable formations, an opposite effect may be had. The drilling fluid may, in its circulation, flow into the porous formation without forming a sheath thereover. Hence, the drilling fluid may not complete its circulation through the well bore in a quantity sufficient to carry the formation cuttings out of the well. As a result, the cuttings tend to settle downwardly in the well bore and collect and pack around the bit, increasing the chances of twisting off the drill stem. Also the height of the fluid column may become insufficient to overcome gas pressure of the formation, resulting in a blow-out.

If the driller can constantly ascertain the volume and density of drilling fluid within the circulation system, he can very effectively control drilling operations in accordance with the formation penetrated. But in conventional methods of rotary drilling the operator is usually unable to quickly detect differences in drilling fluid volume and density. To control the density of the fluid and to make certain that, if the fluid is being lost to the formation, the fact becomes known immediately, it is highly desirable to have a continuous indication and record of the density and level of the circulating fluid. My invention provides such an apparatus.

An object of the invention is to provide improved means for indicating density and total volume of a liquid contained within a plurality of containers. Another object of the invention is to provide means for indicating changes in the volume and density of a drilling fluid during rotary drilling operations. A further object is to provide a means wherein, by simultaneously sampling the fluid pressure at two points within the fluid, one point in a constant liquid level chamber and the other in a varying liquid level chamber, both the volume and density thereof can be determined and recorded. A more specific object is to provide means to aid in preventing blow outs during rotary drilling operations.

In the attached drawing Figure 1 is a schematic view, partly in cross-section, of a drilling rig in operation.

Figures 2, 4, and 5 are schematic drawings of several modifications of the principal elements of the invention as applied to a drilling mud tank.

Figures 3 and 3A, taken together, illustrate the geometric relationship between the several distances and forces involved in the mechanism of the invention.

Figure 7 illustrates an isometric view of a pressure-sensitive element with a portion cut away.

Figure 1:
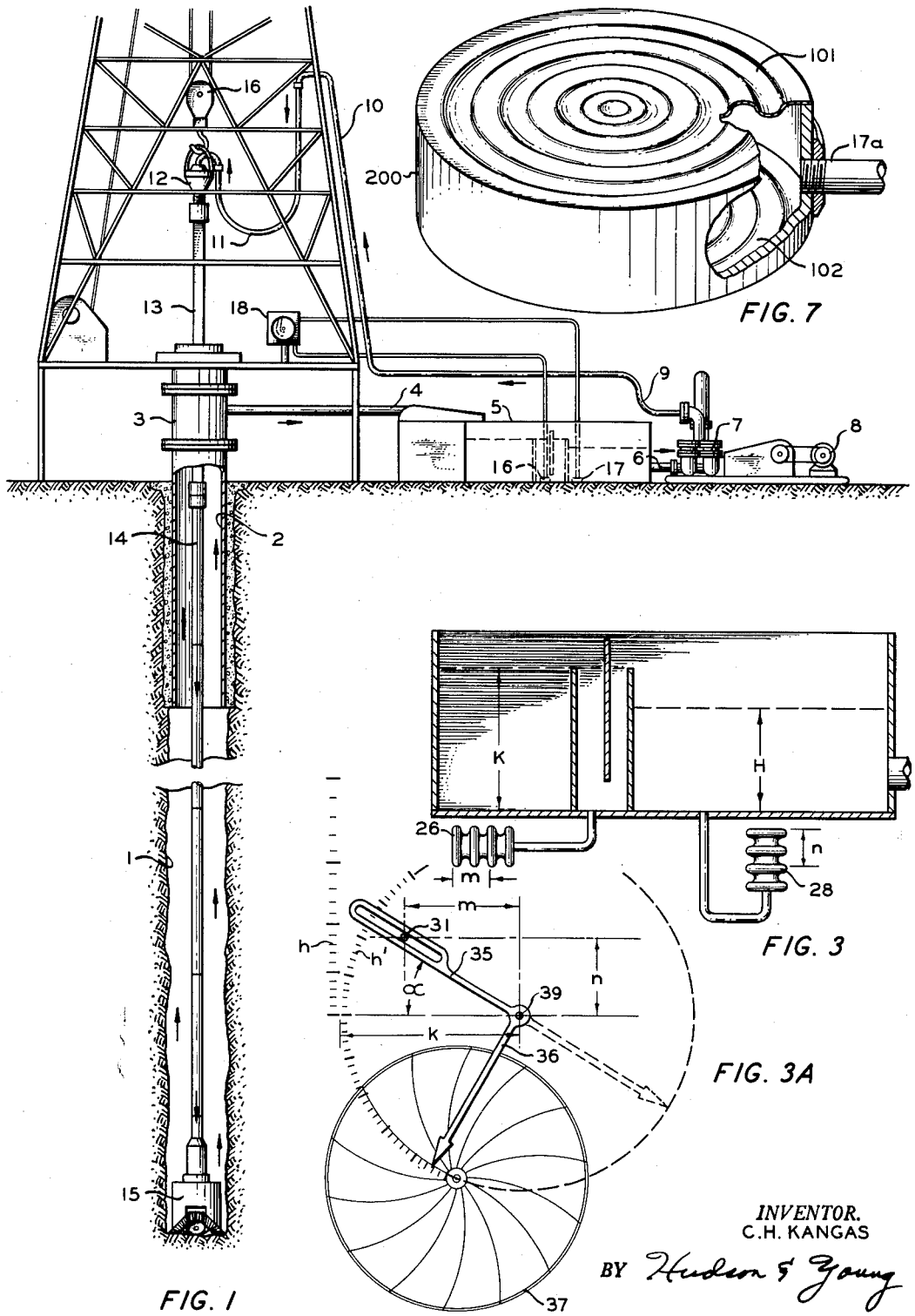

Referring to Figure 1, the hole 1 is partially lined with casing 2 to the top of which is attached a fluid circulation fitting 3 which is connected with a pipe 4 leading to mud tank 5. The suction line 6 connects tank 5 with a pump 7, driven by engine 8. The pressure line 9 connects with standpipe 10, mud hose 11, through swivel 12 with kelley 13, drill pipe 14 and bit 15. The drilling string is supported by traveling block 16 and other common elements of hoisting equipment not shown. Pressure sensing elements 16 and 17 connect with an indicator 18, this indicator being illustrated in more detail in subsequent figures.

Figure 2:
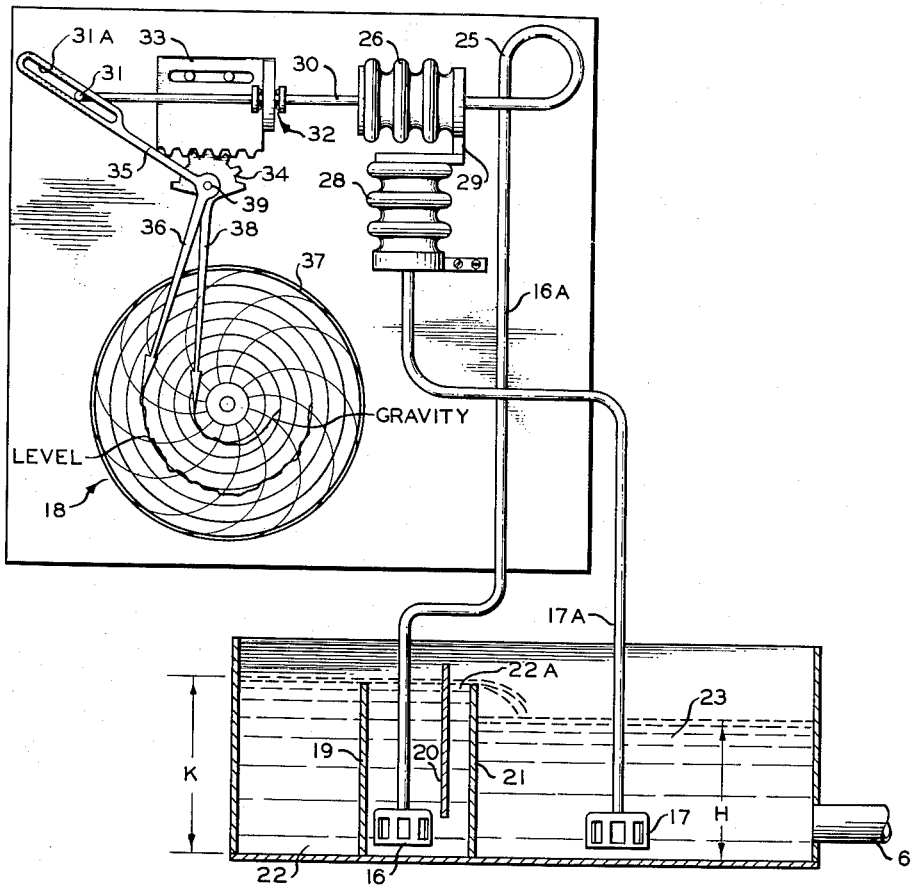

In Figure 2 it can be seen that tank 5 is divided by partitions 19, 20, and 21 into two main compartments 22 and 23 and an auxiliary compartment 22A. Returning mud flows into compartment 22, over baffle 19, around pressure-sensitive element 16, under baffle 20 and over baffle 21 into chamber 23. The provision of tank 22 permits the cuttings to settle out at this point and the zig-zag flow through 22A insures that element 16 will be immersed in a representative sample of the fluid. The height of mud K in chambers 22 and 22A is constant while the height H in chamber 23 is a function of the amount of mud in the tank. Pressure-sensitive element 16 in compartment 22A is connected through rigid conduit 16a and flexible connection 25 with bellows 26, while pressure-sensitive element 17 is connected through rigid conduit 17a to bellows 28. Bellows 28 is permanently mounted at its base and hence can expand or contract only in a vertical direction. One end of bellows 26 is rigidly attached to the free end of bellows 28 by a member 29 as shown. To the other end of bellows 26 is attached a rod 30 to which are attached a pin 31 and assembly 32 including a pair of rollers. A rack 33 is constrained by a pair of pins to move only in a horizontal direction and is in engagement with gear segment 34 attached to pointer 38. Pin 31 rides in a slot 31A in an arm 35 which is pivoted on the immovable shaft 39 of gear segment 34 and also includes pointer 36. It will be seen that rack 33 moves horizontally a distance equal to the expansion or contraction of bellows 26 while pin 31 is free to move both vertically and horizontally under the influence of bellows 26 and bellows 28. The pressure at element 16 is a function of the density of the drilling fluid and of the height of fluid K in chamber 22A. But since level K is constant any changes in pressure detected by element 16 will be a function of the drilling fluid density and indicated by the movement of pointer 38 on a properly calibrated chart. Hence, if pointer 38 is provided with a pin, it provides a continuous record of the density on chart 37. The pressure at element 17 is a function of the density of the fluid and of the height of fluid H. By combining the movement of bellows 26 and 28 in the manner shown, the effect of density is eliminated and the movement of pointer 36 is a function only of H.

The mathematical relationship between the movement of pointer 36 and fluid height H is illustrated in Figure 3 taken with Figure 3A. $m$ represents the extension of bellows 26 while $n$ represents the extension of bellows 28. If it is assumed that bellows 26 and 28 are identical then it follows that $m=Kdc$, K being the height of the fluid column between the baffles, $d$ being the density of the fluid, and $c$ a constant which is a function of the characteristics of the bellows. Similarly, $$n=Hdc, \quad \frac{m}{n}=\frac{Kdc}{Hdc}$$

and $$H=\frac{Kn}{m}$$

The vertical movement of roller $31=n$ while its horizontal movement$=m$. If a vertical scale $h$ is constructed a fixed distance from the center of rotation 39 and if this distance is designated $k$, it follows that the tangent of angle $$\alpha=\frac{h}{k}$$

Also the tangent of angle $$\alpha=\frac{n}{m}$$

It follows that $$\frac{h}{k}=\frac{n}{m}$$

and $$h=\frac{kn}{m}$$

Since $$H=\frac{Kn}{m}$$

it follows that $$H=\frac{hK}{k}$$

Since K and $k$ are both constants, it will be seen that, by proper choice of scale for $h$, the reading on $h$ of a line extending through 39, 31 can be made directly in the units of H. But since a graph of this point would not be feasible a circular scale $h'$ can be constructed with a radius equal to $k$. On this scale arm 35 having a length equal to $k$ can be used to indicate H if the scale of $h'$ is constructed by projecting corresponding points on scale $h$ along radii from the center of rotation 39. It is evident that scale $h'$ can be transposed exactly to chart 37 by making pointer 36 equal to $k$ and placing the center of the chart at the end of the pointer arm as illustrated in Figure 3A. In this arrangement the time interval lines on chart 37 lie on the circle traced by pointer 36. By placing an inking pen on the end of pointer 36, values of H can be recorded. Of course the angle of the pointer 36 and its length could be changed depending on the most convenient location for the chart.

Figure 4:
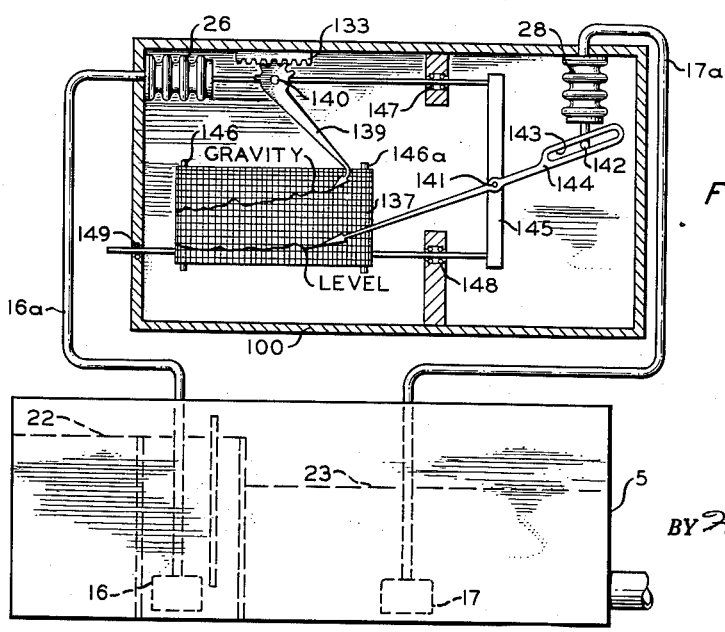

The modified apparatus illustrated in Figure 4 eliminates the need for flexible connection 25 (Fig. 2). Bellows 26, 28 are rigidly affixed at one end to stationary frame 100. However, it is necessary that the chart 137 be attached to sliding frame 145 which is supported on fixedly mounted rollers 147, 148, 149 and impelled horizontally by bellows 26. In this way the chart moves with pivot pins 141 and 142. Bellows 28 controls the movement of pin 142 which rides in a slot 143 on fluid level pointer 144. As bellows 26 moves frame 145 horizontally it actuates pointer 139, via gear segment 140, in relation to fixed rack 133. The recording chart 137, which is a long roll, is actuated by a clock work mechanism (not shown) to move from roller 146a to roller 146. Expansion or contraction of bellows 26 in response to pressure increase or decrease on member 16 results in a corresponding linear displacement of frame 145 and movement of pointer 139 around its axis of rotation 140. This of course gives a continuous record of the specific gravity of the fluid in compartment 22A. The expansion or contraction of bellows 28 depresses or raises pin 142, tending to raise or lower the recording end of pointer 144. This tendency is modified by the position of pin 141, which of course is determined by the distortion of bellows 26. For example where the expansion of bellows 26 equals that of bellows 28 pin 142 will be displaced as far horizontally as it is vertically. By thus combining the movement of bellows 26 and 28 the effect of density is eliminated and pointer 144 indicates only the height of fluid column H.

Figure 5:
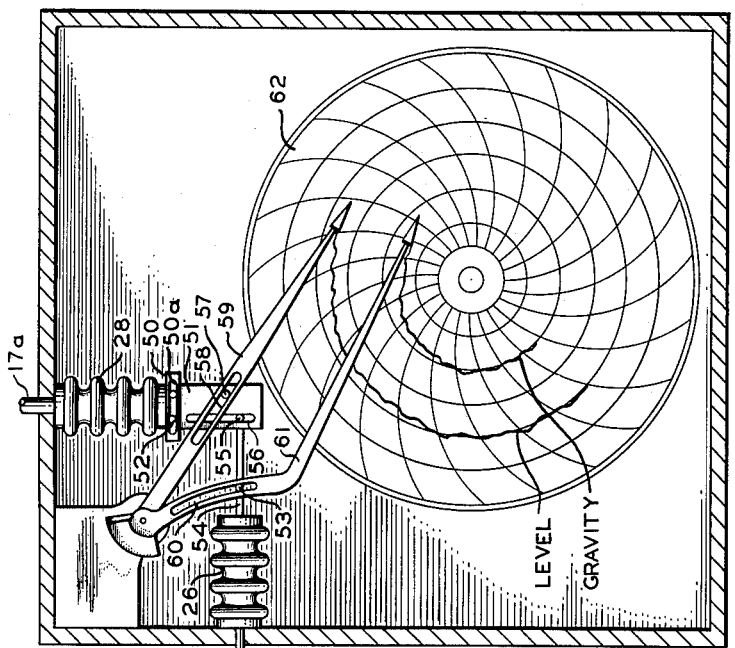

Mechanism illustrated in Figure 5 eliminates the need for flexible connection 25 (Figure 2) and also allows the use of a fixed position chart. This apparatus comprises bellows 28, to which is rigidly attached a flat plate 50 containing an elongated slot 50A. A second plate 51 is suspended from plate 50 by two rollers 52 which move in slot 50A and allow plate 51 to move horizontally with respect to plate 50. To bellows 26 is attached rod 54 terminating in pin 55, which engages a vertical slot 56 in plate 51. A pin 57, attached to plate 51, rides in slot 58 of fluid level pointer 59 to control the movement thereof. Pin 53 in rod 54 engages slot 60 of density pointer 61. Any pressure variation in line 16a results in horizontal movement of rod 54 which, via pin 53, moves pointer 61 up or down on chart 62, indicating the gravity of the fluid under test. Simultaneously the horizontal movement of rod 54 causes a corresponding movement of attached pin 55 which, through pressure on slot 56, moves plate 51 a corresponding horizontal distance. This motion is transmitted through pin 57 to pointer 59 tending to move it up or down on chart 62. The extent of such movement, however, is modified by any variation in the vertical position of pin 57 in response to pressure variations in line 17a and corresponding extension or contraction of bellows 28. If, for example, the two bellows are identical they will be extended an equal distance when the heights of the two liquid columns 22, 23 are equal and pointer 59, representing the vector of two equal right angle forces will assume a 45° angle. Then if only the density changes, the two columns remaining equal in height, there will be no resultant motion in pointer 59 because pin 57 will move along the axis of slot 58.

Figure 6:
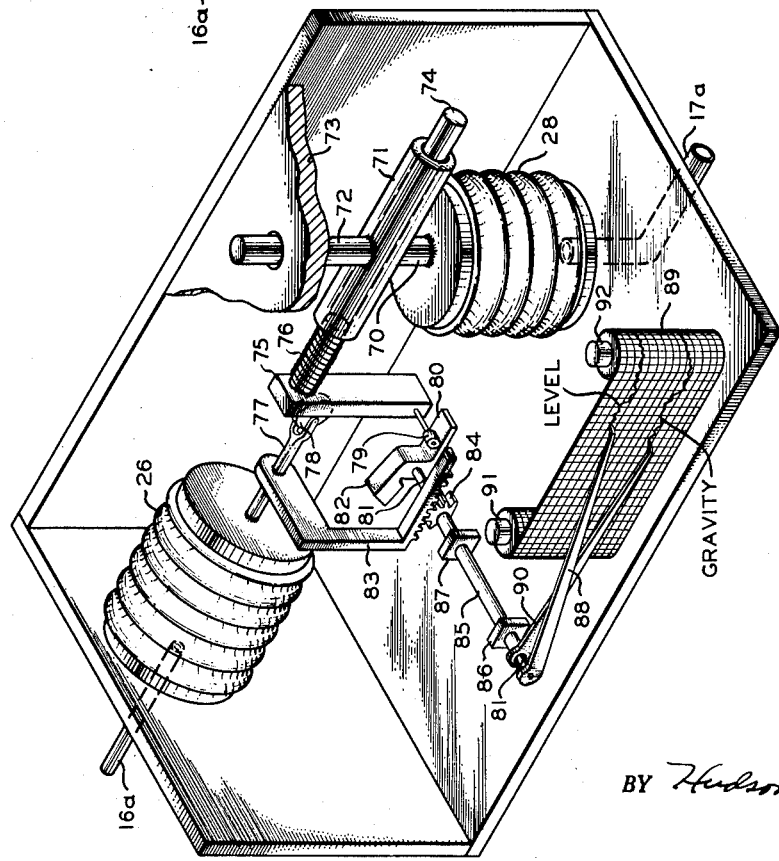
Figure 6 is an isometric view of a fourth modification of the invention.

Figure 6 illustrates a preferred modification of the present invention. In response to pressure variations in line 17a, bellows 28 expands or contracts vertically, transmitting a corresponding up or down motion to rod 70 which in turn raises or lowers sleeve 71. To prevent possible rotary movement of the latter a second rod 72 journalled in fixed bearing member 73 is attached to sleeve 71 colinearly with rod 70. Shaft 74 extends axially through sleeve 71 terminating in a rigidly attached block 75. Compressed helical spring 76 tends to move block 75 via 74 away from sleeve 71. Opposing this tendency is wheel 78 mounted on rod 77 which is attached to bellows 26 and transmits pressure variations from line 16a. Roller 79 extends outwardly from the base of block 75 and rides on the surface of plate 80. The latter is fixedly mounted on shaft 81 and tends to be forced upward against roller 79 as by a counter-weight 82. Arm 83 transmits the reciprocating motion of the rod 77 to gear segment 84 mounted on sleeve 85. Sleeve 85 is journaled in bearing members 86, 87. Pointer 88 is affixed at one end to shaft 81 and transmits the rotary motion of the latter to graphic indicator 89. Pointer 90 likewise transmits the rotary motion of sleeve 85 to recording chart 89. The latter which is a long roll is actuated by clockwork mechanism, not shown, to move from roller 91 to roller 92.

In operation any contraction or extension of bellows 26 in response to the fluid density in line 16a results in linear movement of rod 77. This in turn moves arm 83 over gear segment 84. The resulting change in position of sleeve 85 changes the position of pointer 90, indicating the density of the fluid in chamber 22. Any pressure changes in line 17a are transmitted via bellows 28, rod 70, sleeve 71, and shaft 74 to block 75. Vertical changes in position of this member tend to raise or depress member 80, the corresponding rotation of shaft 81 changing the position of pointer 88. The vertical movement of block 75 may be offset, in whole or in part, by its horizontal movement, as determined by the pressure from wheel 78. If, for example, block 75 is raised a given distance from the position shown in Figure 6 but is simultaneously moved the same distance to the right then roller 79 will roll along plate 80 without changing the position of the latter. In this case there will be no change in the angular position of shaft 81 and hence no change in the position of pointer 88. This will be the case where only the density of the fluid changes, the relative liquid levels remaining constant.

Figure 7 illustrates a typical pressure sensitive element. The end of pipe 17a screws into the interior of puck-shaped member 200 having flexible corrugated diaphragms 101 and 102 rigidly attached to its rim. These corrugations tend to flatten out when the interior pressure of member 200 increases. Hence, any changes in pressure transmitted through line 17a result in a corresponding inflation with flattening, or deflation with corrugating, of the diaphragm members.

Inasmuch as other embodiments of the invention could be made without departing from the scope of the invention it is intended that the modifications described above and in the drawings shall be illustrative of the invention and not limiting.

I claim:

1. In a system for recording the changing volume and density of a liquid stream flowing in a cycle, in one portion of which the stream flows through a sectional container, in combination: a vertical partition in said container which divides the liquid therein into two columns, the first of which continuously overflows the partition into the second column, the liquid level of the first column thus remaining constant while that of the second column varies with changes in the volume of the stream; a first pressure-sensitive element positioned in said first column; a second pressure-sensitive element positioned in said second column; means operatively connected to both elements for vectorially combining the pressure registered by the two said elements, the resultant being a function of the liquid level of both columns and of the liquid density of both columns; means for resolving the resultant into two values, namely, the liquid level of the second column and the density of the liquid; and means for separately indicating each of these two factors.

2. In an apparatus for determining the liquid level and density of a first column of liquid, the level and density of which can vary, said first column being supplied from a second column, the level of which is constant, and wherein the density of the liquid is the same in both columns at any given time, in combination: a pair of pressure-sensitive elements, one positioned in the first column and the other in the second column; means operatively connected to said pair of elements for vectorially combining the pressures registered by said elements, said pressures being a function of both the liquid level and density of each column; means for resolving the resultant of the vectorial addition into (1) the liquid level of the second column, and (2) the density of the stream; and means for continuously indicating these two factors.

3. In a system wherein a stream of liquid flows continuously in a cycle, the volume and density of said stream being subject to fluctuations, and wherein at one point in said cycle the stream overflows a vertical partition which divides that portion of the stream into two adjacent columns, the liquid level of the first column remaining substantially constant because of overflow into the second column while the liquid level of the second column varies with fluctuations in the volume of the stream, in combination, a pressure-detecting element positioned in each column, the pressure detected by this element being determined by the liquid level and density of the column, means for transmitting both pressure values to a single point, means for vectorially combining the two pressures at right angles at said point, means for resolving the resultant force into two components, one component being the liquid level of the second column and the other the density of the liquid, and indicating means for separately recording each of said components.

4. Apparatus of claim 3 wherein the means for vectorially combining the two pressures comprises a pair of bellows rigidly attached to each other at right angles to their long axes, said bellows linearly expanding or contracting in response to the pressures transmitted thereto by the pressure detecting elements, and a rod affixed to one end of one of said bellows and colinear with the axis thereof, said rod functioning to transmit the vector force from the two bellows to said resolving means.

5. In a system for continuously detecting and indicating the varying density and volume of a continuous stream of drilling fluid flowing in a cycle thru a drill-pipe, a well casing, and a tank, said tank being partitioned so as to form two columns of drilling fluid, the first column maintaining a constant liquid level through overflow into the second column, the liquid level of the latter varying with variations in the volume of the stream, in combination: a pressure-sensitive element positioned in each of said columns, each element comprising a disk covered with a flexible diaphragm; a first and second bellows; means rigidly connecting said bellows to each other at right angles to their long axes; a pair of rigid tubes connecting the pressure-sensitive elements to the bellows, whereby variations in the pressure on the cup diaphragm are communicated to the bellows, resulting in linear elongation or shortening thereof; a first rod connected to one end of the first bellows and adapted for reciprocating motion with the expansion or contraction of said bellows, a rack and gear segment assembly, one member of which is mounted on said first rod and the other member on an external fixed pivot, the two members being always in mesh; a recording device comprising a pointer, one end of said pointer being integral with said gear segment whereby any rotation of the latter rotates the free end of the pointer, and a graphic recording surface which registers the movement of said free end of the pointer, whereby the reciprocating motion of the first rod is transmitted through said rack and pinion to said pointer, the fluctuations of which are an index of the fluctuating density of the liquid stream.

6. In the apparatus of claim 5, a pin set in the forward end of said first rod, an arm attached at one end to said fixed pivot, the other end of the arm being in slotted engagement with said pin whereby movement of the rod is transmitted through said pin to said arm; a second pointer, one end of which is rigidly connected to said arm, the other end of the pointer contacting the graphic recording surface, whereby any movement of the rod which forces the pin against the side of the slot results in movement of said second pointer over the recording surface.

7. In the apparatus of claim 5, a second rod connected to the second bellows as an extension thereof, a pin set in the extended end of said second rod, a second pointer in slotted engagement with said pin and in contact with said recording surface, pivot means engaging an intermediate point in the length of said pointer and rigidly connected to said first rod so as to move therewith, whereby the stress on each bellows is applied to said second pointer at a different point on its length, the resultant of the two stresses determining the motion of the pointer.

8. In a system comprising two columns of the same liquid, the first column having a constant liquid level while that of the second column is subject to change, and wherein the liquid density in either column does not vary with respect to that of the other column but the density of both may vary as a unit with respect to time, in combination: an apparatus for continuously recording the changes in the liquid level of the second column and in the density of both, said apparatus comprising a pair of pressure-sensitive elements, one immersed in each column of liquid; a pair of generally cylindrical bellows, the bases of which are immovably affixed at right angles to each other, a pair of rigid tubes connecting the pressure-sensitive element in the first column with the first bellows and the pressure-sensitive element in the second column to the second bellows, said tubes establishing fluid communication between the interiors of the pressure-sensitive elements and respective bellows; a first rod connected to the unattached end of the first bellows and colinear with the long axis thereof so as to be advanced or retracted with the expansion or contraction of the bellows; a second rod attached in like manner to the second bellows; a rack and gear segment assembly, the gear segment being rotatably mounted on a pin set at right angles in said first rod, the rack being fixed with respect to the gear segment and in mesh therewith; a graphic indicating surface mounted parallel to said first rod and affixed thereto so that the two members are advanced or retracted as a unit; a first pointer, one end of which is integral with the gear segment, the other end being in contact with the indicating surface, whereby density changes in the liquid as transmitted from the pressure-sensitive elements through the bellows to the rod and gear segment are continuously recorded by said pointer on said indicating surface; an arm mounted in slotted engagement with the aforesaid second rod by means of a pin set in the end of said second rod, said pin riding in a slot within the arm, the unslotted portion of said arm terminating in a second pointer in contact with the indicating surface; a pivot shaft extending at right angles thru said arm at an intermediate point in its length and functioning as a center of rotation for said arm; and means rigidly connecting said pivot shaft with the first rod so that the two move as a unit; whereby the stress applied to the slotted portion of the arm, in conjunction with that applied thru the pivot shaft, causes a resultant movement of the pointer with respect to the indicating surface.

9. In a system comprising two columns of the same liquid, the first column having a constant liquid level while that of the second column is subject to change, and wherein the liquid density in either column does not vary with respect to that of the other column but the density of both may vary as a unit with respect to time, in combination: an apparatus for continuously recording the changes in the liquid level of the second column and in the density of both, said apparatus comprising a pair of pressure-sensitive elements, one immersed in each column of liquid, a pair of generally cylindrical bellows, the bases of which are immovably affixed at right angles to each other, a pair of rigid tubes connecting the pressure-sensitive element in the first column to the first bellows and the pressure-sensitive element in the second column to the second bellows, said tubes establishing fluid communication between the interiors of the pressure-sensitive elements and respective bellows; a first rod connected to the unattached end of the first bellows and colinear with the long axis thereof so as to be advanced or retracted with the expansion or contraction of the bellows; a roller attached to the free end of said rod; a second rod in sliding attachment with the second bellows and at right angles to the central axis thereof, said second rod being extended toward the first rod and parallel thereto, a block rigidly mounted on said second rod a compressed spring urging said block and attached rod against the roller on said first rod; a sleeved shaft at right angles to the two rods; a rack and gear segment assembly connecting said first rod to the said sleeved shaft, said rack being fixedly mounted on said first rod and said gear segment being mounted on the sleeve and in mesh with the rack; a pointer attached to the sleeve at right angles therewith, so that reciprocating motion of the first rod as transmitted through said rack and gear segment to said sleeve causes rotation thereof around the shaft with resulting rotation of the attached pointer; a plate-like member attached to said shaft and extending tangentially therefrom, a second pointer mounted on the shaft at right angles thereto and adjacent said first pointer, means operatively connecting the aforesaid block on the second rod with the surface of the plate, whereby any change in the position of the second rod and attached block results in a change in the position of the plate with accompanying rotation of the shaft and attached pointer; and a graphic recording surface over which the ends of the two pointers move, thereby continuously indicating the density of the liquid in the columns and the liquid level of the second column.

10. In a system comprising two columns of the same liquid, the first column having a constant liquid level while that of the second column is subject to change, and wherein the liquid density in either column does not vary with respect to that of the other column but the density of both may vary as a unit with respect to time, in combination: an apparatus for continuously recording the changes in the liquid level of the second colum and in the density of both, said apparatus comprising a pair of pressure-sensitive elements, one immersed in each column of liquid, a first resilient member fixed in space and designed to expand or contract in only one dimension; a second resilient member likewise fixed in space and designed to expand or contract in a dimension perpendicular to that in which the first member moves; a pair of conduits each connecting one of the pressure-sensitive elements with one of the resilient members and providing fluid communication between the interiors thereof, whereby changes in the pressure on the pressure sensitive elements results in an expansion or contraction of the resilient members, a first recording means, a second recording means; means for transmitting the 1-dimensional distortion of the resilient members to said recording means, the force transmitted to said first indicating means being the resultant of the vector addition of the two right angle forces and the force transmitted to the second indicating means being but one of the two right angle forces.

11. In a system wherein two columns of the same liquid are maintained at the same density but wherein the density is subject to change, and wherein the first column is maintained at a constant level while the level of the second column may vary, in combination: an apparatus designed to continuously record the height of the variable column and the density of the liquid in the columns, said apparatus comprising a pair of pressure-sensitive elements positioned within each column at the same height from the base thereof, a recording surface, a first pointer and a second pointer in contact with said surface and designed to record thereon, means for communicating the fluid pressure detected by the pressure-sensitive element in the first column to both pointers, means for communicating the fluid pressure detected by the pressure-sensitive element in the second column to only the second pointer, whereby any movement of the first pointer is necessarily in response only to density changes in the first column, and a direct mechanical linkage between said first and second pointers designed to neutralize the effect of density on the second pointer, whereby the latter indicates only the liquid level of the second column corrected for density.

12. In a system comprising two columns of the same liquid, the first column having a constant liquid level while that of the second column is subject to change, and wherein the liquid density in either column does not vary with respect to that of the other column but the density of both may vary as a unit with respect to time, in combination: an apparatus for continuously recording the changes in the liquid level of the second column and in the density of both, said apparatus comprising a pair of pressure-sensitive elements, one immersed in each column of liquid, a pair of bellows immovably affixed at right angles to each other, a pair of rigid tubes connecting the pressure-sensitive element in the first column with the first bellows and the pressure-sensitive element in the second column to the second bellows, said tubes establishing fluid communication between the interiors of the pressure-sensitive elements and respective bellows; a first rod connected to the movable end of the first bellows colinearly with the long axis thereof so as to be advanced or retracted with the expansion or contraction of the bellows; a second rod connected to the movable end of the second bellows as an extension thereof so as to reciprocate in the same direction as the bellows, the connection being such that it also enables the rod to move at right angles to its long axis, thus giving it 2-dimensional movement; a graphic indicating surface; a pair of slotted pointers mounted on a common shaft fixed in space, the free ends of said pointers contacting said indicating surface, a first linkage connecting an intermediate portion of one of said pointers to said first rod whereby the reciprocating motion of said rod causes rotation of the pointer about said common shaft; a second linkage connecting an intermediate portion of the other pointer to both rods, whereby any changes in the positions of the two rods results in a net change in the position of the second pointer as expressed by rotation of said pointer about said common shaft.

References Cited in the file of this patent

UNITED STATES PATENTS

| | | |
|---|---|---|
| Re. 17,728 | Burningham | July 15, 1930 |
| 1,067,073 | Steiger | July 8, 1913 |
| 1,660,503 | Greenfield | Feb. 28, 1928 |
| 1,834,987 | Van Eyk | Dec. 8, 1931 |
| 2,382,695 | De Giers | Aug. 14, 1945 |
| 2,601,777 | Woodward | July 1, 1952 |
| 2,677,963 | Mullins | May 11, 1954 |